United States Patent [19]
Hengel

[11] Patent Number: 5,360,187
[45] Date of Patent: Nov. 1, 1994

[54] PARACHUTE HAVING IMPROVED VENT LINE STACKING

[75] Inventor: John E. Hengel, Huntsville, Ala.

[73] Assignee: The United States of America as represented by the Administrator of the National Aeronautics and Space Administration, Washington, D.C.

[21] Appl. No.: 37,877

[22] Filed: Mar. 29, 1993

[51] Int. Cl.$^5$ ............................................. B64D 17/02
[52] U.S. Cl. ................................... 244/145; 244/142
[58] Field of Search ............................. 244/142, 145

[56] References Cited

U.S. PATENT DOCUMENTS

| | | | |
|---|---|---|---|
| 1,931,160 | 10/1933 | Knight | 244/145 |
| 2,134,362 | 10/1938 | Frieder | 244/145 |
| 2,925,971 | 2/1960 | Istel et al. | 244/145 |
| 3,173,636 | 3/1965 | Sepp, Jr. | 244/145 |
| 3,240,451 | 3/1966 | Sepp, Jr. | 244/145 |

FOREIGN PATENT DOCUMENTS 2641415  3/1978  Germany ............................. 244/145

OTHER PUBLICATIONS

NASA *Tech Briefs*, Apr. 1992, pp. 75-76, Inventor: John E. Hengel Improved Stacking of Vent Lines of a Parachute.

*Primary Examiner*—Michael S. Huppert
*Assistant Examiner*—Virna Lissi Ansley
*Attorney, Agent, or Firm*—Robert L. Broad, Jr.; Guy M. Miller; Alan J. Kennedy

[57] ABSTRACT

A parachute having an improved vent line stacking wherein the parachute is provided with a canopy having a central vent opening and a vent band secured to the canopy around the periphery of the vent opening, with a plurality of vent lines each lying on a diameter of the vent opening and having its ends secured to the vent band on opposite sides of the vent opening. The vent lines are sewed to the vent band in an order such that a the end of a first vent line is sewed to the vent band at a starting point with the end of a second vent band then being sewed to the vent band adjacent to and counterclockwise from the first band. A third vent band is sewed to the vent band adjacent to and clockwise from the first band, with a fourth vent band being sewed to the vent band adjacent to and counterclockwise from the second vent band. It can be seen that, if the vent lines are numbered in the order of being sewed to the vent band, the odd numbered vent lines will run consecutively in a clockwise direction and the even numbered lines will run consecutively in a counterclockwise direction from the starting point. With this order of assembly, each and every vent line will be separated from adjacent vent lines by no more than one vent line in the center of the vent opening where the vent lines cross.

3 Claims, 4 Drawing Sheets

PARACHUTE HAVING IMPROVED VENT LINE STACKING

ORIGIN OF THE INVENTION

This invention was made by an employee of the United States Government and may be manufactured and used by or for the Government for governmental purposes without the payment of any royalties.

BACKGROUND OF THE INVENTION

1. Field of the Invention

This invention relates to parachutes.

2. Prior Art

Parachutes having vents are known. These parachutes have shroud lines extending upward from a harness to the periphery of a canopy made of a fabric, with radial lines extending up the canopy to a vent band secured to the canopy and extending around the periphery of the vent. To carry the load which is transmitted from the harness upward through the shroud and radial lines, the parachute is provided with a plurality of vent lines. The ends of each of the vent lines are secured to the vent band on opposite sides of the vent opening so that each vent line lies on a diameter of the vent opening.

The ends of the vent lines are evenly spaced around the periphery of the vent opening. The conventional parachute is made by starting at one point on the vent band and sewing the vent lines, one at a time, to the vent band. This sewing operation progresses around the vent band in a clockwise (or counterclockwise) direction for 180 degrees, at which time the operation is completed.

A major disadvantage of this structure is that, while the ends of the first and last vent lines sewed lie next to each other on the vent band, the centers of these lines, where all of the vent lines cross at the center of the vent opening, are separated by all of the other vent lines. The first vent line sewed to the vent line will lie at the bottom of this stack and the last will lie at the top of the stack. Under a load, these adjacent (on the vent band) vent lines extend from the vent band at an angle to each other such that the tension forces applied to the vent band by these vent lines under a heavy load tends to tear the vent band.

SUMMARY OF THE INVENTION

A parachute having a central vent opening with a plurality of vent lines extending across the vent opening, with the ends of the vent lines being secured to a vent band extending around the periphery of the vent opening. Each vent line lies on a diameter of the vent opening with the centers of the vent lines forming a stack in the center of the vent opening. The vent lines are so positioned that vent lines adjacent to each other on the vent band are separated from each other in the stack by no more than one vent line.

DETAILED DESCRIPTION OF THE INVENTION

Referring now in detail to the drawings, there is shown a parachute 11 having a canopy 12 and a plurality of shroud lines 13 secured to the periphery of the canopy 12 and extending downward to a harness (not shown). The canopy 12 is provided with a central vent opening 16 around the periphery of which is secured a vent band 19. A plurality of radial lines 20 extend upward from the periphery of the canopy to transmit the load of the harness to the vent band 19.

Figure 4:
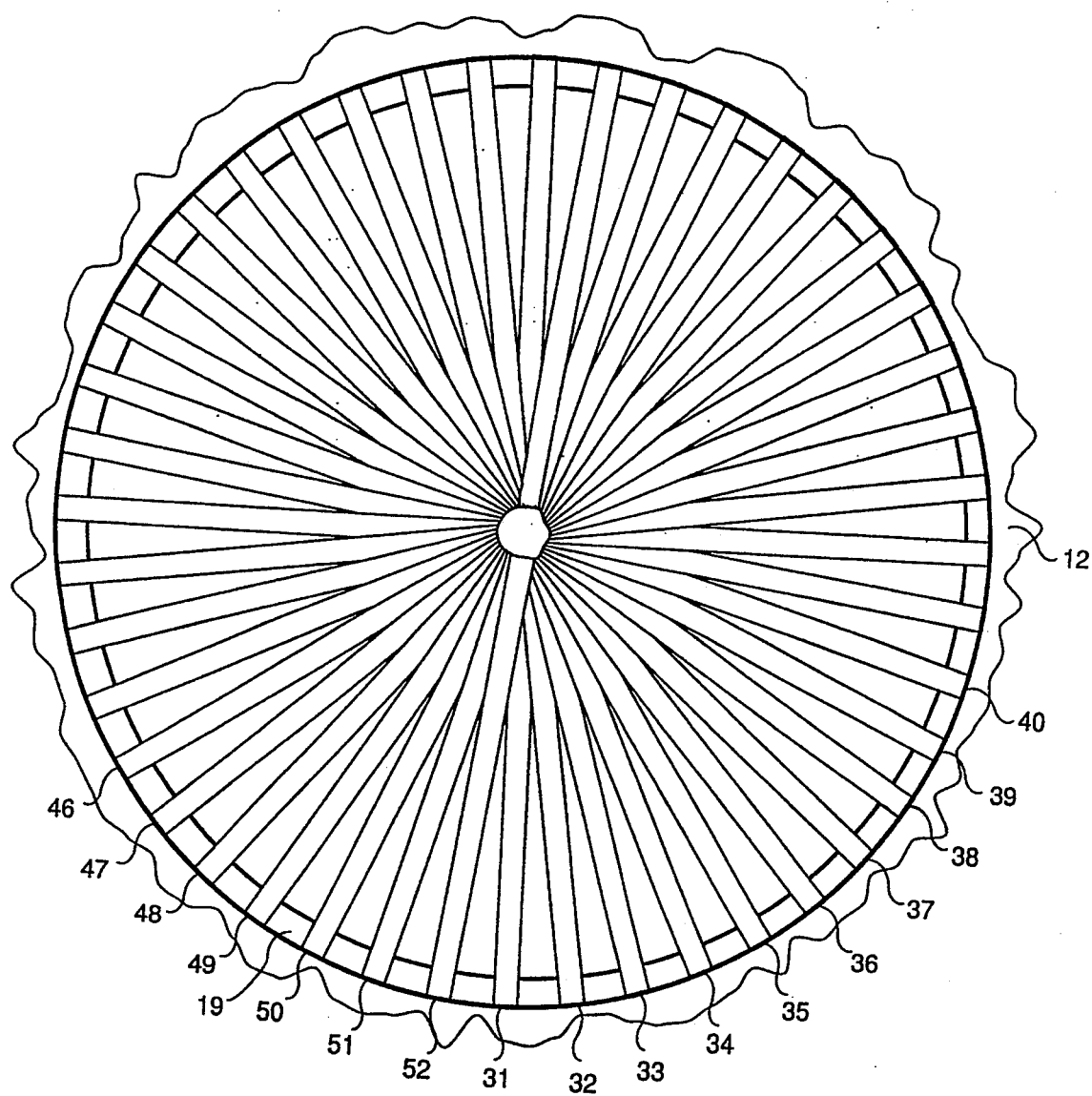
FIG. 4 is a fragmentary view of a prior art parachute as seen from below showing the order in which the vent lines are secured to the parachute vent band.

To prevent damage to the canopy adjacent to the vent opening 16 a plurality of vent lines 31–52 extend across the vent opening, with each vent line lying on a diameter of the vent opening 16 and having its ends secured to the vent band 19 on opposite sides of the vent opening 16. FIG. 4 shows the order in which the vent lines 31–52 are sewed to the vent band in the prior art parachute. A first vent line 31 is sewed to the vent band 19. A second vent 32 line is sewed to the vent band adjacent to the first line 31, a third 33 is sewed to the vent band 32 adjacent to the vent line 32, etc. This is continued in a clockwise (or counterclockwise direction) until the last vent line 52 is sewed into place adjacent the first line 31.

Figure 1:
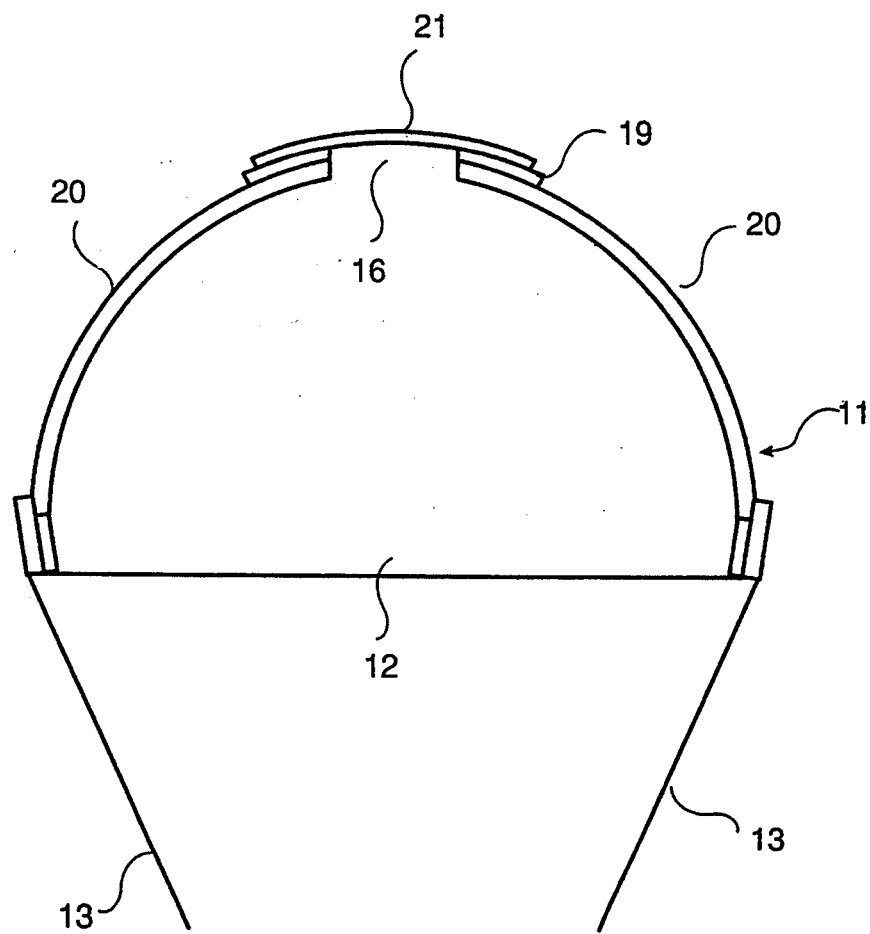
FIG. 1 is a fragmentary schematic cross-sectional view of a conventional parachute showing its various parts, with the various parts being left unhatched for clarity.
Figure 2:
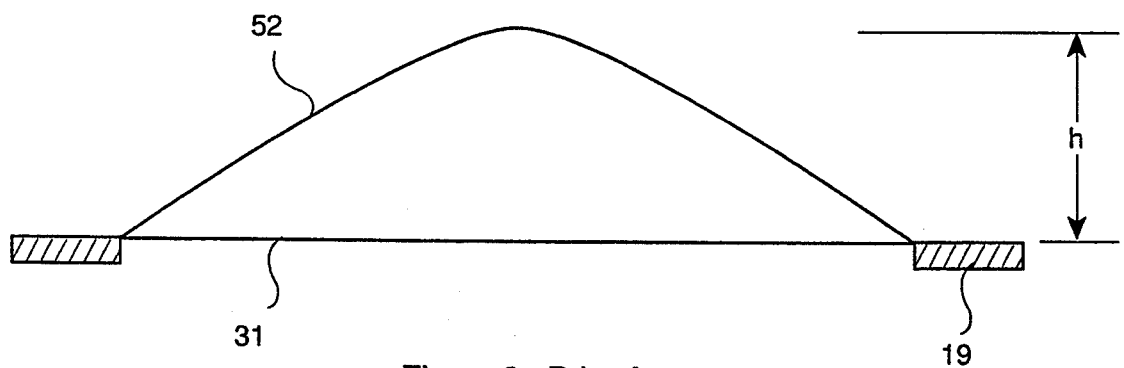
FIG. 2 is a schematic side view showing the spacing between the two adjacent vent lines which were the first and last lines to be assembled on the conventional parachute.

FIG. 2 shows the configuration of the first and last vent lines 31 and 52. Since all of the vent lines cross at the center of the vent opening 16, the lines will form a stack having a height h (FIG. 2). The first vent line 31 will lie at the bottom of the stack while the last vent line 52 will cross over the top of the stack, with a significant angle 55 FIG. 3) between them. Under a large load, the tensile forces in the first and last lines 31 and 52 are applied to the vent band 19 in directions which differ by the angle 30. If these forces are large enough the vent band will be torn between the lines 31 and 52. This cannot happen in the parachute of this invention.

Figure 5:
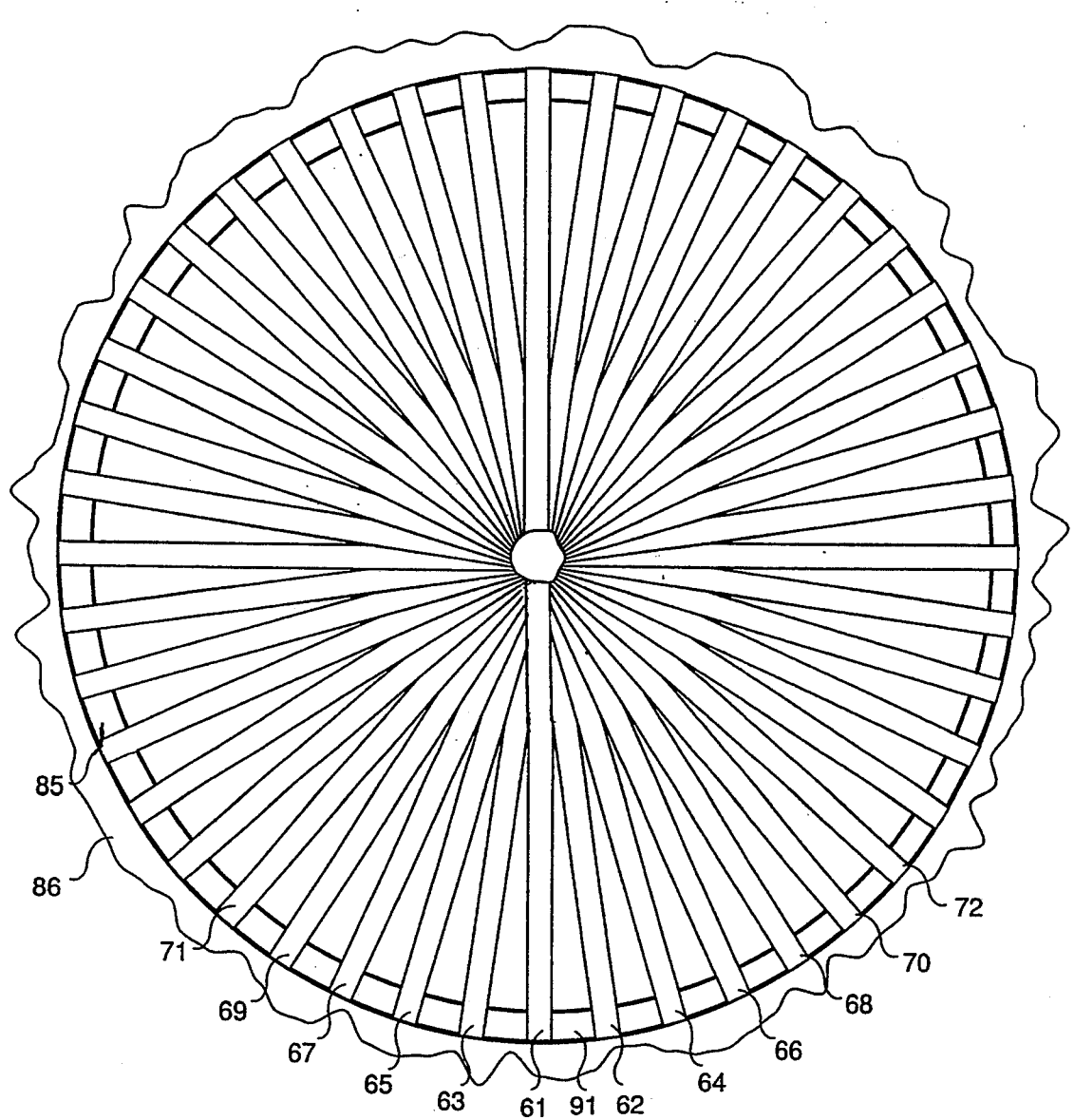
FIG. 5 is a fragmentary view of a the parachute of this invention as seen from below showing the order in which the vent lines are attached to the vent band to produce the desired structure of this invention.

FIG. 5 is a fragmentary plan view showing the manner in which a plurality of vent lines 61–82 are secured to a vent band 85 which is secured to a canopy 86 of the parachute of this invention. Beginning at a point 91 on the vent band 85 the vent lines are consecutively numbered by consecutive odd numbers 61–81 in a clockwise direction. Beginning at the same point 91, the vent lines are consecutively numbered by consecutive even numbers 62–82 in a counterclockwise direction. It should be noticed that the starting numbers 61 and 62 are "adjacent" numbers, i.e., they differ by one.

In assembling the vent assembly the vent lines 61–82 are sewed to the vent band in consecutive order. The vent line 61 is sewed to the vent band 85 clockwise from the point 91. Then the vent line 62 is sewed to the vent band adjacent to the vent band 61 but counterclockwise from the point 91. The vent line 63 is then sewed to the vent band 85 adjacent and clockwise from the vent line 61, whereupon the vent line 64 is sewed to the vent band 85 adjacent to and counterclockwise from the vent line 62. This process, which is continued until all of the vent lines have been sewed to the vent band, results in the structure of this invention.

Figure 3:
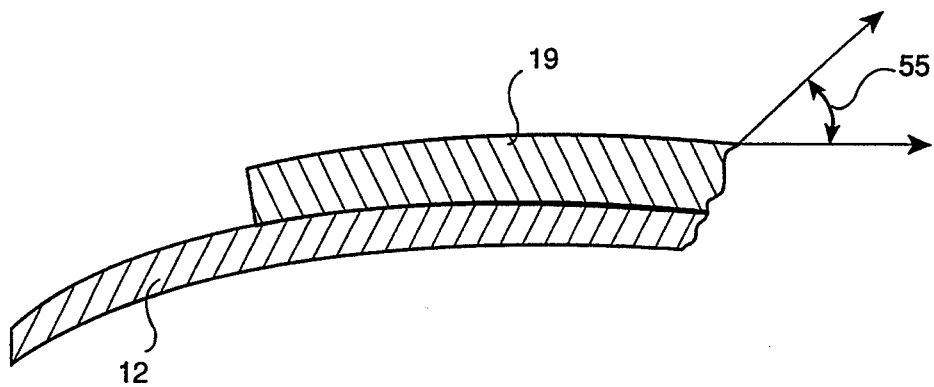
FIG. 3 is a fragmentary side view showing the structure of FIG. 2, with arrows being used to indicate the forces applied to the parachute vent band by the two vent lines of FIG. 2.

From this it can be seen that, when the vent lines are so numbered, each vent line is positioned in the stack of vent lines at the center of the vent opening between "adjacently numbered" vent lines. In order words, the vent line 62 is positioned in the stack between the vent lines 61 and 63, the vent line 63 is positioned in the stack between the vent lines 62 and 64, etc. By assembling the vent lines in this manner each and every vent line in the stack is separated from an adjacent vent line by no more than one vent line. This solves the prior art problem where the first and last vent lines assembled are adjacent to each other at the vent band but are separated by all of the other vent bands in the stack, as shown in FIGS. 2-4.

What is claimed is:

1. A parachute; comprising
   a. a canopy having a central vent opening;
   b. a vent band secured to the canopy and extending around the vent opening;
   c. a plurality of vent lines, each of said vent lines lying on a diameter of the vent opening and being attached to the vent band at diametrically opposed points between the ends of adjacent vent lines, said vent lines crossing each other to form a stack at the center of the vent opening, said vent lines being so positioned in the stack such that each and every vent line is separated in the stack by no more than one vent line from those vent lines attached to the vent band at points adjacent to the points of attachment of said each vent line.

2. The parachute of claim 1 wherein every vent line in said stack is separated from adjacent vent lines by no more than one vent line.

3. The parachute of claim 1 wherein said vent lines are in the form of bands.

* * * * *